United States Patent [19]

Hou

[11] Patent Number: 5,264,553
[45] Date of Patent: Nov. 23, 1993

[54] METHOD OF FORMING UNIFORM POLYMER SPHERES, COMPOSITE PARTICLES AND POLYMER ENCAPSULATED PARTICLES

[75] Inventor: Wei-Hsin Hou, Bethlehem, Pa.

[73] Assignee: Coulter Corporation, Miami, Fla.

[21] Appl. No.: 822,472

[22] Filed: Jan. 17, 1992

Related U.S. Application Data

[63] Continuation-in-part of Ser. No. 645,174, Jan. 24, 1991.

[51] Int. Cl.$^5$ ................................................ C08F 6/00
[52] U.S. Cl. ...................................... 528/502; 430/137; 521/56; 521/61; 526/201; 528/486; 528/499
[58] Field of Search ......................... 528/486, 499, 502; 526/201; 430/137; 521/56, 61

[56] References Cited

U.S. PATENT DOCUMENTS

| | | | |
|---|---|---|---|
| 3,674,719 | 7/1972 | Jenkins | 521/61 |
| 4,702,840 | 10/1987 | Degen et al. | 528/502 |
| 4,782,097 | 11/1988 | Jain et al. | 521/56 |
| 4,885,350 | 12/1989 | Yamashita et al. | 526/201 |
| 4,904,562 | 2/1990 | Yusa et al. | 430/138 |
| 5,061,766 | 10/1991 | Yamashita et al. | 526/191 |

*Primary Examiner*—John Kight, III
*Assistant Examiner*—Shelley A. Dodson
*Attorney, Agent, or Firm*—Sidney N. Fox

[57] ABSTRACT

A method for forming fine polymer particles, including core/shell polymer composite particles and polymer-encapsulated liposome particles. A polymer solution is formed using a selective solvent which enables the polymer to be precipitated from the solution upon a change in condition thereof. The change in condition may be effected by lowering of the temperature of the solution and/or introducing a non-solvent to the solution. With respect to the formation of the polymer-encapsulated liposome particles, the liposome particles are included when the polymer solution is formed. One embodiment of the method for forming the core/shell particles includes the selective solvent being immiscible with water to form the polymer solution (oil phase), the addition of deionized water containing an emulsifier to the solution, forming the emulsion, cooling the resulting emulsion to precipitate a one polymer from the emulsion as oil drops leaving the other polymer in solution therein, evaporating the selective solvent solidifying the other polymer thereby encapsulating the one polymer forming the core/shell particles.

18 Claims, No Drawings

METHOD OF FORMING UNIFORM POLYMER SPHERES, COMPOSITE PARTICLES AND POLYMER ENCAPSULATED PARTICLES

REFERENCE TO COPENDING APPLICATION

This application is a continuation-in-part of copending U.S. patent application of Wei-Hsin Hou, Ser. No. 07/645,174, Filed Jan. 24, 1991 and entitled Method of Forming Polymer-encapsulated Particles, the specification of said application being incorporated by reference herein for the disclosure thereof.

FIELD OF THE INVENTION

This invention relates generally to techniques for forming fine polymer particles and more particularly, is directed to a method for forming uniform core/shell spherical polymer particles characterized generally as mono-dispersed particles, and including composite as well as fine polymer-encapsulated particles, including polymer-encapsulated liposome particles, the particles having controllable size and shape and having utility as standards and as calibrators for particle size instruments and carriers and receptor sites for cytology applications.

BACKGROUND OF THE INVENTION

The copending patent application provided a novel selective precipitation method for forming polymer particles and polymer-encapsulated particles useful as standards, as calibrators and, when the encapsulated substances are pigments, as liquid toners for electrophotographic application.

The referenced earlier method utilizes copolyamide polymers which result from the polymerization of polyamide monomers, such as Nylon-6, Nylon-6-6 and Nylon-12. These polymers have been particularly well suited to the encapsulation of pigments for employment as liquid toners used in electrophotographic toning applications. In addition, the use of polymeric seeds as encapsulants for forming core/shell composites was suggested generally.

However, further discoveries have been made whereby the formation of so-called core/shell polymer composites can be facilitated by employing other than the polyamide polymers. The resulting core/shell polymer composites are more suitable than those composites for use as standards and calibrators than those resulting from the specific composites disclosed in the prior application.

Further, the ability of employing the general methodology disclosed in the earlier patent application for encapsulating such substances as liposomes was not obvious from the disclosures in the pending application and is not believed obvious therefrom, as only inorganic pigments were described therein as encapsulate. The polymer-encapsulated liposome particles have utility as carriers for the lipid substances, such as cholesterol, lecithin and the like, for example.

SUMMARY OF THE INVENTION

The invention provides a method for forming core/shell polymer composite particles, as well as method for forming polymer-encapsulated liposome particles, said core/shell polymer composite particles being formed by dissolving a pair of polymers in a selected solvent and precipitating one of the polymers by either lowering the temperature of solution to form polymer seed particles to form the core and adding a non-solvent to the resulting suspension of core particles, to precipitate the other polymer to encapsulate the core particles as the shell therefor. Another embodiment of the method according to the herein invention involves the use of a selected solvent for a pair of homopolymers to form a polymer solution, adding thereto deionized water containing an emulsifier to form an emulsion of said homopolymers, selectively lowering the temperature of said polymer solution to precipitate one of the homopolymers from said emulsion, remove the selective solvent from said polymer solution to solidify the dissolved polymer so as to encapsulate the earlier precipitated polymer. Liposomes are polymer encapsulated using aqueous systems, that is aqueous polymer solutions or suspensions in the presence of the liposome particles, with the precipitation of the polymer effected by cooling the polymer solution or suspension and/or introducing a selected non-solvent for the polymer to the solution and/or suspension.

DESCRIPTION OF PREFERRRED EMBODIMENTS

The invention herein comprises a method for forming uniform fine polymer spheres and composite particles, including polymer encapsulated liposomes.

Generally, two homopolymers, polymer A and polymer B, or a block polymer with block A and block B is dissolved in a selected solvent to form a polymer solution. One of the polymer chains is precipitated from such solution either by lowering the temperature of the solution or by adding a non-solvent to the solution. The criteria for selecting the solvent is its relative interaction with one of the polymers compared with its interaction with the other one of the polymers. If the selective solvent has stronger interaction with polymer A (or block A), then polymer B (or block B) will be precipitated earlier to form a core and polymer A would come out of the solution later to form a shell, and vice versa. Thus core/shell or inverse core/shell particles are formed.

A variation of the method of the invention comprises the steps of dissolving two homopolymers, polymer A and polymer B, or a block copolymer A with Block A and Block B, or a graft polymer of polymer A grafted onto the polymer B backbone, in a selective solvent to form a polymer solution (oil phase). The selective solvent must be immiscible with water. Next, the polymer solution is mixed with deionized water containing an emulsifier. The mixture either is sonified (treated with ultrasonic vibrations) and/or homogenized to form an emulsion. The temperature of the emulsion is lowered to precipitate polymer A (or polymer B) out of the polymer solution (for example, oil drops) with the remaining polymer B (or polymer A) dissolved therein. The selective solvent then is evaporated out of the oil drops under vacuum at low temperatures to solidify the dissolved polymer B (or polymer A) to encapsulate the earlier precipitated polymer A (polymer B). The solvent should be carefully selected. If the selective solvent has stronger interaction with polymer A (or block A) than polymer B (or block B), polymer B will be precipitated earlier to form a core and polymer A will come out of solution later, to form a shell, and vice versa. Thus, core/shell or inverse core/shell latexes are formed.

Specific examples showing the use of the method of the invention will be described hereinafter, with the first examples illustrating the non-emulsion embodiment of the invention and the second group of examples illustrating the use of an emulsifying agent in the formation of the core/shell particles.

EXAMPLE 1

Polystyrene and polybutadiene homopolymers are dissolved in 1,4 dioxane at 60 degrees Celsius. The solvent, 1,4 dioxane is selected because it is a good solvent for polystyrene but is a theta solvent (poor) for polybutadiene at 34 degrees Celsius (or lower). The temperature of the solution is lowered from 60 degrees Celsius to 20 degrees Celsius to precipitate polybutadiene as seed particles suspended in the remaining polystyrene solution Methanol, a non-solvent for both polystyrene and polybutadiene, is added to the suspension of the polybutadiene seed particles so as to precipitate polystyrene, thereby encapsulating the polybutadiene seeds. Polybutadiene/polystyrene core/shell particles thus are formed.

EXAMPLE 2

Polystyrene and polybutadiene homopolymers are dissolved in cyclohexane at 60 degrees Celsius. Cyclohexane is selected as the solvent because cyclohexane is a good solvent for polybutadiene but is a theta solvent for polystyrene at 34 degrees Celsius. The temperature of the resulting solution is lowered from 60 degrees Celsius to 20 degrees Celsius. Polystyrene thus is precipitated to form seed particles which are suspended in the polybutadiene solution. Methanol is added to the resulting suspension whereby to precipitate polybutadiene, thereby encapsulating the polybutadiene seed particles and forming polystyrene/polybutadiene core/shell particles.

EXAMPLE 3

A styrene-butadiene copolymer is dissolved in 1,4 dioxane at 60 degrees Celsius. The temperature of the resulting solution is lowered from 60 degrees Celsius to 20 degrees Celsius to precipitate polybutadiene block forming seed particles suspended in polystyrene solution. Methanol then is added to the resulting suspension, precipitating polystyrene block, forming the polybutadiene/polystyrene core/shell particles.

EXAMPLE 4

Using cyclohexane as the selective solvent, a styrene-butadiene copolymer is dissolved therein at 60 degrees Celsius. The temperature of the said solution is lowered from 60 degrees Celsius to 20 degrees Celsius so as to precipitate polystyrene block as polystyrene seed particles suspended in the remaining polybutadiene solution. Methanol (as the non-solvent) is added to the resulting suspension, precipitating the polybutadiene block to encapsulate the polystyrene seed particles forming either polystyrene/polybutadiene core/shell particles.

EXAMPLE 5

Two homopolymers, polystyrene and polybutadiene homopolymers, are dissolved in methyl ethyl ketone at 60 degrees Celsius, methyl ethyl ketone. The resulting polystyrene/polybutadiene polymer solution is mixed with an aliphatic isoparafinnic hydrocarbon, for example, Isopar (a trademark of Exxon Corporation) containing poly(12-hydroxy stearic acid)-g-poly(methylmethacrylate-methacrylic acid), a surfactant. The mixture then is emulsified with a homogenizer forming an emulsion at 60 degrees Celsius. The temperature of the emulsion is lowered from 60 degrees Celsius to 0 degrees Celsius by placing same in an ice bath. The polybutadiene thus is precipitated out of the polymer solution. The solvent, methyl ethyl ketone, is removed out of the Isopar with a rotary evaporator at room temperature to solidify the polymer solution drops so as to encapsulate the pre-precipitated polybutadiene. Finally, a polybutadiene/polystyrene core/shell latex is formed.

EXAMPLE 6

Polystyrene and polybutadiene homopolymers are dissolved in cyclohexane at 60 degrees Celsius forming a polystyrene/polybutadiene solution. To said polymer solution (oil phase), deionized water containing an emulsifier, sodium lauryl sulfate, is added. The resulting mixture is emulsified with a homogenizer to form an emulsion at 60 degrees Celsius. Using an ice bath, the resulting emulsion is cooled from 60 degrees Celsius to 0 degrees Celsius, precipitating the polystyrene out of the oil phase. The cyclohexane solvent is removed out of the oil phase with a rotary evaporator at room temperature, solidifying the oil drops to encapsulate the pre-precipitated polybutadiene block, forming a polystyrene/polybutadiene core/shell latex.

EXAMPLE 7

A styrene-butadiene copolymer is dissolved in methyl ethyl ketone at 60 degrees Celsius, the resulting polymer solution being mixed with Isopar containing poly(12-hydroxystearic acid)-g-poly(methyl methacrylate-methacrylic acid) and then the resulting mixture emulsified with a homogenizer to form an emulsion at 60 degrees Celsius. The emulsion is cooled to 0 degrees Celsius using an ice bath, precipitating the polybutadiene block out of the polymer solution. The methyl ethyl ketone is removed out of the Isopar using a rotary evaporator at room temperature to solidify the polymer solution drops encapsulating the pre-precipitated polybutadiene block. Thus, a polybutadiene/polystyrene core/shell latex is formed.

EXAMPLE 8

Using a styrene-butadiene copolymer, the same steps followed in performing the method of Example 6 are followed, using cyclohexane as the selective solvent and sodium lauryl sulfate as the emulsifer, whereby finally to form a polystyrene/polybutadiene core/shell latex.

As referred to earlier, it has been discovered that the methods provided in the referenced copending application can be employed to encapsulate a liposome, a particle of lipoidal substance such as cholesterol, lecithin and the like, by a polymer, such as cellulose, polyalcohols or polyethylene oxide, in an aqueous system. A non-solvent for the polymer can be added to the solution either before, after or instead of cooling to cause the polymer to precipitate out of the solution, encapsulating the liposome particles. The polymer encapsulated liposome particles can be separated (or isolated) as by removing the non-solvent from the supernatent. The following example is illustrative of such encapsulation.

EXAMPLE 9

A water soluble polymer, cellulose, is added to deionized water in the presence of the liposome, cholesterol, at 70 degrees Celsius forming an aqueous cellulose solution. The temperature of the solution is reduced by cooling in a flowing ice bath from 70 degrees Celsius to about 0 degrees Celsius. The cellulose polymer precipitates from the solution, encapsulating the liposome, forming generally uniform cellulose encapsulated liposome particles.

Other aqueous polymer systems can be utilized so long as the change in temperature condition results in the polymer precipitating while the liposome remains suspended and thus, the polymer-encapsulated liposome can be encapsulated by the precipitating polymer. The polymer must be soluble in the solvent, such as water, which, under change of conditions, becomes a non-solvent for said polymer, or the solution can be treated with a non-solvent for said polymer to cause the polymer to be precipitated from the solution.

It is believed that the core/shell polymer particles produced according to the method of the invention range in size from about 0.2 to 10 microns in size and the polymer-encapsulated liposome particles are believed to be in the range about 1 to 20 microns in size as compared to the size of the polymer-encapsulated pigment particles.

The specific polymers and solvents are described and identified as examples of preferred materials, but same may be varied or substituted for others of similar properties and/or variations may be made in the described conditions, i.e. temperatures, for example, without departing from the spirit and scope of the invention as described in the appended claims.

What I claim is:

1. A method of forming fine polymer particles comprising the steps of:
    selecting a polymer and a solvent for the polymer for forming a polymer/solvent solution, the selected solvent being a good solvent for the polymer under a first condition and being a poor solvent for the polymer under a second condition,
    said first condition being the condition of formation of the solution, the second condition requiring the occurance of one of first and second events, said first event being reduction of the temperature of the polymer/solvent solution from the temperature of formation thereof to a temperature between about 0 degrees Celsius to about 20 degrees Celsius, and the second event being the addition of a non-solvent for the polymer to the polymer/solvent solution subsequent to formation thereof;
    forming said polymer/solvent solution;
    adding liposome particles to the polymer/solvent solution;
    effecting said second condition by effecting one of said first and second events to precipitate the polymer from said polymer/solvent solution, the precipitating polymer simultaneously encapsulating the liposome particles to form a suspension of fine polymer encapsulated liposome particles;
    removing one of the solvent and non-solvent where present; and
    isolating the precipitated fine polymer encapsulated particles from said suspension thereof.

2. The method according to claim 1 in which the selected solvent is deionized water.

3. The method according to claims 1 or 2 in which the solvent solution is formed at an elevated temperature between 60 degrees Celsius and 70 degrees Celsius.

4. The method according to claims 1 or 2 and the step of effecting both the first and second events successively.

5. The method according to claims 1 or 2 in which the selected solvent is removed by evaporation.

6. A method of forming fine polymer particles comprising the steps of:
    selecting at least a pair of polymers and a solvent therefor for forming a solution thereof, the solvent having a stronger interaction with one of said pair of polymers than with the other of said pair of polymers;
    forming said solution at a temperature of 60 to 70 degrees Celsius;
    lowering the temperature of said solution from the temperature of formation to 0 degrees Celsius to 20 degrees Celsius effecting the precipitation of the one of said pair of polymers which has the stronger interaction with the solvent than the other of said pair of polymers prior to the precipitation of the other of said pair of polymers thereby forming a suspension of seed particles;
    adding a non-solvent for said pair of polymers to the solution causing the other of said pair of particles to precipitate from the solution simultaneously encapsulating the seed particles as a suspension of core/shell fine polymer particles, the second to precipitate particles forming the shell and the first to precipitate particles forming the core; and
    removing the solvent and the non-solvent to recover the resulting precipitated fine core/shell polymer particles.

7. The method as claimed in claim 6 in which the temperature of the solution is lowered substantially from the temperature of formation thereof effecting precipitation of the one polymer which has the stronger interaction with the other of said two polymers prior to the precipitation of the said other of the two polymers forming said seed particles.

8. The method as claimed in claim 6 in which a non-solvent for said two polymers is added to the solution further to change the condition of said solution and cause the other of the two polymers to precipitate from the solution encapsulating the first to precipitate seed particles.

9. The method as claimed in claim 6 which the selective solvent is 1,4 dioxane and the non-solvent is methanol.

10. The method as claimed in claim 6 in which the selected solvent is 1,4 dioxane, the selected non-solvent is methanol, the one polymer of the pair of polymers is polystyrene and the other polymer of the pair of polymers is polybutadiene.

11. The method as claimed in claim 6 in which the selected solvent is cyclohexane, the selected non-solvent is methanol, the one polymer of the pair of polymers is polybutadiene and the other polymer of the pair of polymers is polystyrene.

12. A method of forming fine polymer particles comprising the steps of:
    forming a solution of a styrene-butadiene copolymer in 1-4 dioxane at a temperature of about 60 degrees Celsius;
    lowering the temperature of the styrene-butadiene copolymer/1-4 dioxane solution to about 0 to 20 degrees Celsius causing the styrene block of said copolymer to precipitate from said solution forming a suspension of polystyrene core particles in the remaining solution;

adding a non-solvent for the butadiene block of said copolymer to the remaining solution causing the styrene block of said copolymer to precipitate from said solution as polybutadiene simultaneously encapsulating the polystyrene seed particles; and, evaporating the non-solvent whereby to isolate the resulting fine polystyrene/polybutadiene core/shell polymer particles.

13. A method forming fine polymer particles comprising the steps of:

selecting a pair of homopolymers and a solvent therefor for forming a solution thereof, the solvent having a stronger interaction with one of the said pair of polymers than with the other of the pair of pair of homopolymers, is immiscible in water and the solution as formed is an oil phase, forming said solution at a temperature of 60 to 70 degrees Celsius;

mixing said solution at the temperature of formation with deionized water containing an emulsifer;

homogenizing said deionized water/homopolymers/solvent/emulsifier mixture to form an emulsion thereof;

lowering the temperature of the resulting emulsion to 0 to 20 degrees Celsius so as to precipitate one of the polymers out of the homopolymer solution sa oil drops, the other of said homopolymers remaining in solution;

removing the selected solvent from the oil drops by evaporation solidifying the other of the homopolymers whereby to effect the encapsulation of the pre-precipitated polymer particles by said other of the homopolymers.

14. The method as claimed in claim 13 in which the pair of homopolymers are polystyrene and polybutadiene, the selective solvent is cyclohexane.

15. A method of forming fine polymer particles comprising the steps of:

forming a solution of a styrene-butadiene copolymer, in methyl ethyl ketone at a temperature of 60 to 70 degrees Celsius, mixing the solution with an aliphatic isoparafinnic hydrocarbon containing an emulsifier, forming an emulsion by homogenizing the copolymer/cyclohexane/aliphatic hydrocarbon/emulsifer mixture, lowering the temperature of the resulting emulsion to between about 0 and 20 degrees Celsius to precipitate the butadiene block of the copolymer out of the copolymer solution as polybutadiene polymer, removing the cyclohexane from the remaining aliphatic isoparafinnic hydrocarbon solution at room temperature to solidify the remaining block of the copolymer as polystyrene causing the encapsulation of the precipitated polybutadiene polymer particles by the polystyrene as fine polystyrene/polybutadiene core/shell polymer particles; and, recovering said precipitated core/shell polymer particles.

16. The method according to claim 16 in which the emulsifier is poly(12-hydroxy-stearic acid)-g-poly (methyl methacrylate-methacrylic acid).

17. Core/shell fine polymer particles having generally uniform size formed by dissolving at least two homopolymers in a selective solvent at a temperature of 60 to 70 degrees Celsius, the selective solvent having a stronger interaction with one of the homopolymers than with the other of the homopolymers when one of first and second events occur, the first event occuring with the lowering of the temperature of the solution when formed to about 0 to 20 degrees Celsius and the second event being the addition of a non-solvent for the homopolymers to the solution, lowering the temperature of the solution from the temperature of formation to about 0 to 20 degrees Celsius, effecting precipitation of one of the homopolymers out of said solution as a suspension of homopolymer seed particles, introducing a non-solvent for said homopolymers to the remaining solution to effect precipitation of said other homopolymer encapsulating said homopolymer seed particles, and, recovering the encapsulated homopolymer seed particles.

18. The fine polymer-encapsulated liposome particles formed by dissolving a polymer in a selected solvent in the presence of liposome particles, said selected solvent being a good solvent for said polymer at the temperature of formation of the solution and a poor solvent for the polymer when the temperature of the solution is lowered from the temperature of formation to a temperature of about 0 to 20 degrees Celsius effecting precipitation of the polymer out of the solution simultaneously encapsulating the liposome particles and the particles are recovered.

* * * * *